July 23, 1968
O. SCHWENG
3,393,906
ROPE OR CHAIN RUPTURE SAFETY DEVICE ON BLOWING
DEVICES FOR REFINING CRUDE IRON
Filed Sept. 30, 1965
2 Sheets-Sheet 1
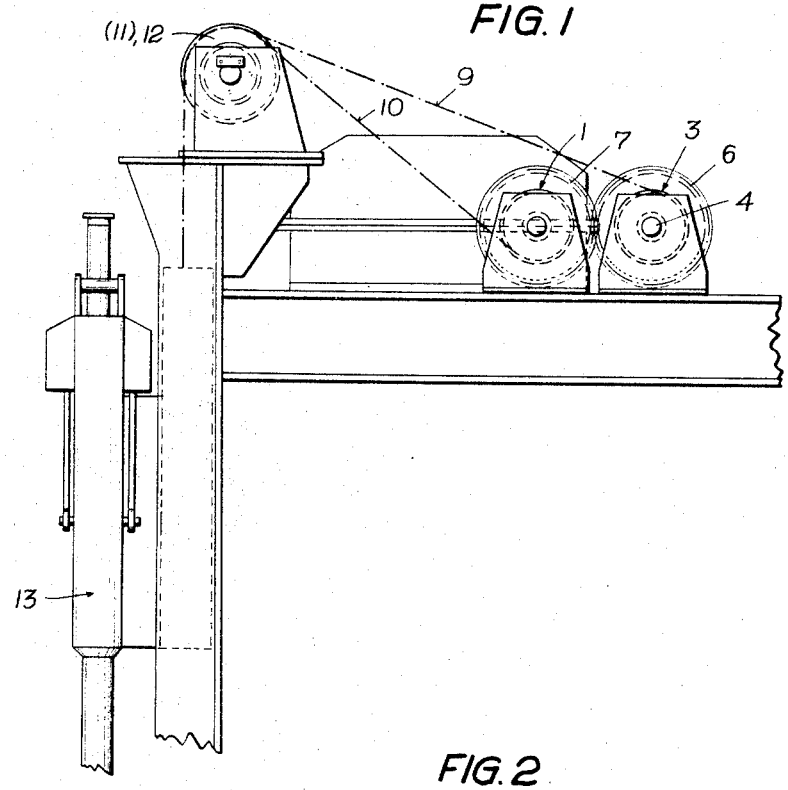
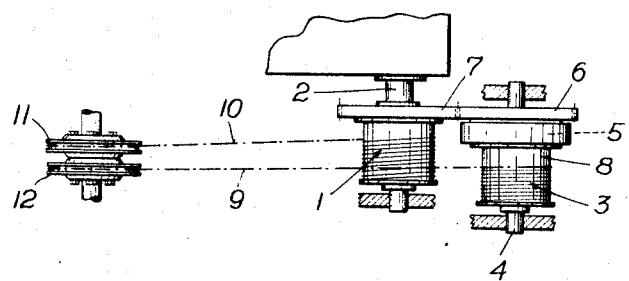
INVENTOR
OTTO SCHWENG
BY
HIS ATTORNEYS

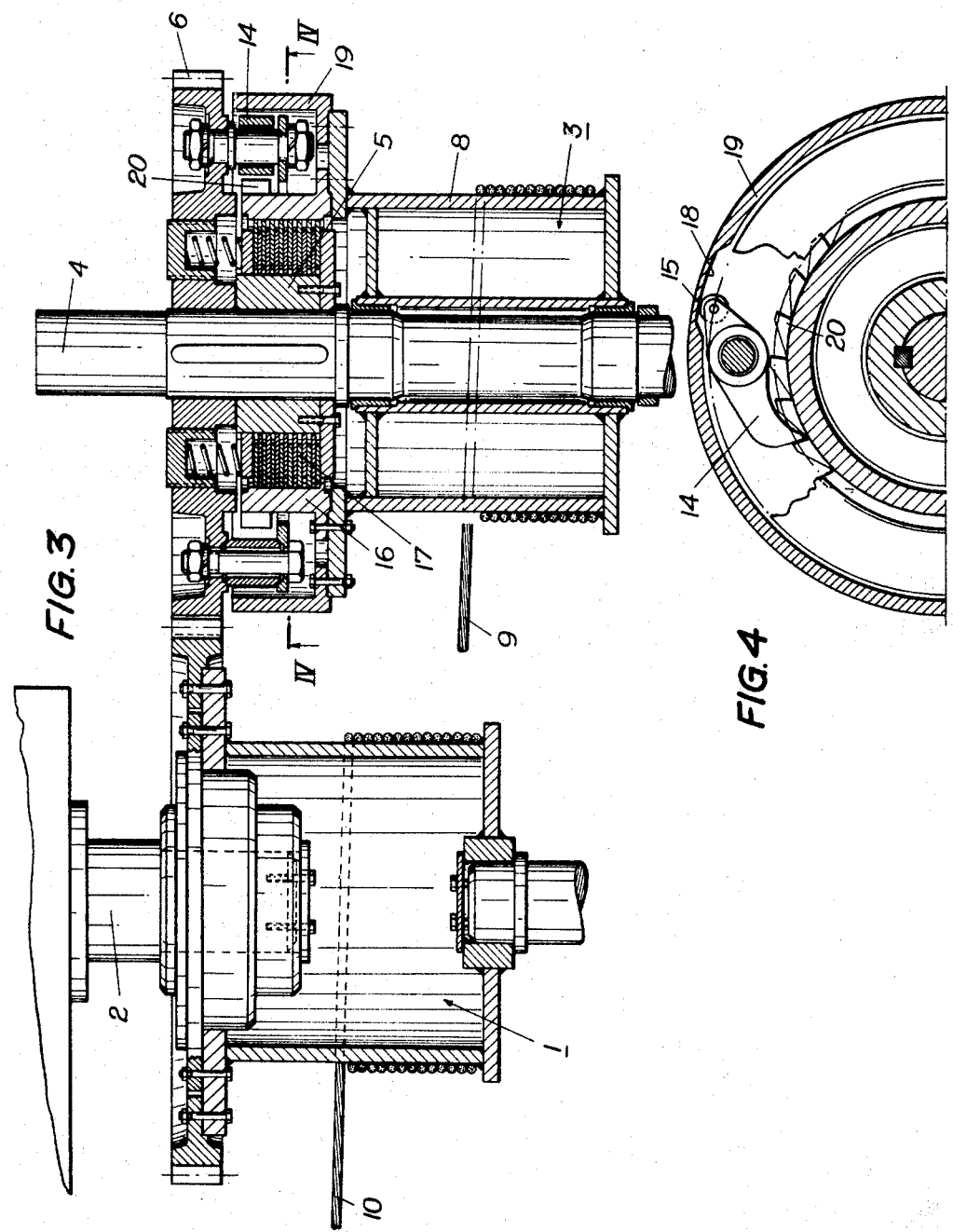

United States Patent Office 3,393,906
Patented July 23, 1968

3,393,906
ROPE OR CHAIN RUPTURE SAFETY DEVICE ON BLOWING DEVICES FOR REFINING CRUDE IRON
Otto Schweng, Linz, Austria, assignor to Vereinigte Osterreichische Eisen- und, Stahlwerke Aktiengesellschaft, Linz, Austria, a company of Austria
Filed Sept. 30, 1965, Ser. No. 491,709
Claims priority, application Austria, Oct. 2, 1964, A 8,426/64
5 Claims. (Cl. 266—34)

ABSTRACT OF THE DISCLOSURE

In the particular embodiment of the invention described herein, a blowing lance hoist includes two ropes which are wound on adjacent drums, one of the drums being connected directly to a drive motor. The other rope drum is linked to the motor drive shaft through a friction clutch and also through a safety catch which is adapted to be engaged only after operation of the friction clutch.

According to a proposal of the applicant a rope or chain rupture safety device on blowing devices used for refining crude iron has already been known in which the blowing lance is connected with two rope hoists or chain blocks. One rope hoist or chain block is passed over the main rope drum or main chain wheel, which is driven, and the other rope hoist or chain block is passed over an auxiliary rope drum or auxiliary chain wheel, which is unstressed, the said main rope drum (main chain wheel) and said auxiliary rope drum (auxiliary chain wheel) being adapted to be coupled, in the event of a rope or chain rupture, by means of a ratchet safety catch.

Although the above-described device has stood the test, experience has shown that with great heights of fall there is a certain risk. When the main rope breaks and the lance falls down, the impact occurring when the pawl is caught in the idling safety wheel may be so strong that the pawl breaks. A friction clutch provided between the driving shaft and the motor, which has also been proposed, can by no means hold the dropping lance.

It is an object of the present invention to avoid these difficulties. In particular, the invention has as its object to provide such an arrangement of the coupling elements between the main driving shaft and the idling auxiliary rope drum that they will cooperate in an optimum manner and that any danger of a failure of the safety device will be reliably avoided also with great heights of fall, without any material increase in constructional expenditure being necessary.

The invention resides in that the friction clutch and the rigid coupling are arranged one behind the other so that the rigid coupling is released not until the resistance of the friction clutch has been overcome. In this way, the impact of a dropping lance, upon a rutpure of the suspension means, is first cushioned by the friction clutch. Depending on the height of fall, the descent of the lance will come to a standstill, or, when the friction clutch is overloaded, the lance will slowly continue to go down, whereupon the coupling catches. If a ratchet safety catch is used as the rigid coupling, as in the applicant's previous proposal, the impact on the pawl will, of course, be positively mitigated, and the stress on the pawl and one the ratchet wheel, respectively, will be much lower than in the known device. Any danger of a breach of the pawl thus does no longer exist.

According to a preferred embodiment of the invention the auxiliary rope drum consist of two parts which are arranged on a common shaft, one of said parts being rigidly coupled with hte shaft of the main rope drum, suitably by means of a gear connection, so as to be synchronous therewith, and the other part, which is designed as a drum, being in stress-transmitting connection with said first part, under normal conditions, through the friction clutch, additional coupling means being provided between said two parts which are operated when a given torque is exceeded, i.e. when the resistance of the friction clutch has been overcome. The friction clutch is preferably designed as a multi-plate clutch.

The rigid coupling may be a ratchet safety catch in which one or several hinged pawls are provided on the synchronously moving part of the auxiliary rope drum and a ratchet wheel as well as a disc-shaped, trip-dog type releasing mechanism for the pawls are arranged on the idling part of the auxiliary rope drum, which is in stress-transmitting connection with said former part.

In order that the invention may be more fully understood an embodiment in accordance therewith will now be described by way of example with reference to the accompanying drawing, in which: FIG. 1 is a lateral view of a blowing equipment fitted with the safety device according to the invention; FIG. 2 is a corresponding top view; FIG. 3 is a horizontal sectional view of the two rope drums; and FIG. 4 illustrates a detail of the releasing mechanism for the rigid coupling.

Numeral 1 denotes the main rope drum. Instead of the rope drum, a chain wheel for an endless chain could also be used. The main driving shaft is designated by 2. Beside the main rope drum, the auxiliary rope drum 3 is arranged, which consists of two parts 5 and 8 disposed on a common shaft 4. Part 5 is rigidly coupled, by means of meshing spur gears 6 and 7, with the main rope drum to be synchronous therewith, whereas the proper drum part 8 is movable relative to part 5. By means of the rope hoists 9 and 10, which are passed over rollers 11 and 12, the blowing lance 13 is suspended.

The contruction and function of the device according to the invention is evident in detail from FIGS. 3 and 4. Numerals 7 and 6 again denote the gears of the main rope drum 1 and of the auxiliary rope drum 3, respectively. Gear 6 and part 5 are rigidly mounted on the shaft 4. This part will thus move synchronously with the main driving shaft 2. A number of pivotable pawls 14, which have running wheels 15 on one end, are rigidly mounted on the gear 6 and run also synchronously with the main driving shaft. Drum part 8 and a cup-shaped part 16 coherent therewith are arranged with a clearance on shaft 4; under normal operating conditions these parts are unstressed. Between the cup-shaped part 16 and the synchronously moving part 5 a multi-plate clutch 17 is arranged. This multi-plate clutch establishes a stress-transmitting connection between parts 5 and 16. When, in the event of a rupture of the main rope 10, a shock-like stress acts on drum 8 and a given torque is exceeded, the frictional resistance between parts 5 and 16 is overcome and a relative movement occurs between these parts. The fall thus is softly braked through the multi-plate clutch. When the relative movement has reached a given extent, which is dependent on the number of pawls, the rollers 15 of the pawls 14 drop into trip-dog-like recesses 18 of the disc 19, so that the pawls of the ratchet wheel 20 catch. In this moment a rigid coupling is accomplished. The lance can then be lifted and lowered in the usual manner.

What I claim is:
1. A rope rupture safety device on blowing devices for refining crude iron, comprising a blowing lance secured to two rope hoists, whereof one rope hoist is passed over a driven main rope drum and the other rope hoist is passed over an idling auxiliary rope drum, said main rope drum and said auxiliary rope drum being adapted to be coupled to each other in the event of a rope rupture, the coupling means comprising a friction clutch and a rigid coupling and means for engaging the rigid coupling only after operation of said friction clutch.

2. A chain rupture safety device on blowing devices for refining crude iron, comprising a blowing lance secured to two chain blocks, whereof one chain block is passed over the driven main chain wheel and the other chain block is passed over an idling auxiliary chain wheel, said main chain wheel and said auxiliary chain wheel being adapted to be coupled to each other in the event of a chain rupture, the coupling means comprising a friction clutch and a rigid coupling and means for engaging the rigid coupling only after operation of said friction clutch.

3. A safety device as set forth in claim 1, wherein said auxiliary rope drum consists of two parts arranged on a common shaft, one part being rigidly coupled with the shaft of said main rope drum to be synchronous therewith and the other part, which is designed as a drum, being in stress-transmitting connection with said first part, under normal conditions, through said friction clutch, said means for engaging the rigid coupling comprising shifting means provided between said two parts which are adapted to engage said rigid coupling when a given torque is exceeded and the resistance of said friction clutch has been overcome.

4. A rope rupture safety device on blowing devices for refining crude iron, comprising a blowing lance secured to a first rope hoist passed over a driven main rope drum and to a second rope hoist passed over an auxiliary rope drum consisting of two parts arranged on a common shaft, the first part being rigidly coupled with the shaft of said main rope drum to be synchronous therewith and the second part being coupled with said first part through a multi-plate type friction clutch, a rigid coupling, which is designed as a ratchet safety catch and comprises a number of hinged pawls arranged on said synchronous first part of the auxiliary rope drum and the ratchet wheel as well as a disc-shaped trip-dog type releasing mechanism for said pawls provided on said second part of the auxiliary rope drum, being arranged behind said friction clutch so as to effect a rigid connection between said main rope drum and said second part of said auxiliary rope drum in the event of a rope rupture, when a given torque is exceeded and the resistance of said friction clutch has been overcome.

5. A chain rupture safety device on blowing devices for refining crude iron, comprising a blowing lance secured to a first chain block passed over a driven main chain wheel and to a second chain block passed over an auxiliary chain wheel consisting of two parts arranged on a common shaft, the first part being rigidly coupled with the shaft of said main chain wheel to be synchronous therewith and the second part being coupled with said first part through a multi-plate type friction clutch, a rigid coupling, which is designed as a ratchet safety catch and comprises a number of hinged pawls arranged on said synchronous first part of said auxiliary rope drum and a ratchet wheel as well as disc-shaped trip-dog releasing mechanism for said pawls provided on said second part of said auxiliary rope drum, being arranged behind said friction clutch so as to establish a rigid connection between said main chain wheel and said second part of said auxiliary chain wheel in the event of a chain rupture, when a given torque is exceeded and the resistance of said friction clutch has been overcome.

References Cited

UNITED STATES PATENTS

| 252,085 | 1/1882 | Dryden | 254—175 |
| 2,026,350 | 12/1935 | Looschen | 192—12 |
| 3,025,047 | 3/1962 | Reinfeld et al. | 266—34.2 |
| 3,276,759 | 10/1966 | Kardos et al. | 266—34.2 |

FOREIGN PATENTS 613,139  5/1935  Germany.

J. SPENCER OVERHOLSER, *Primary Examiner.*

E. MAR, *Assistant Examiner.*